United States Patent
Garney et al.

(10) Patent No.: US 6,260,119 B1
(45) Date of Patent: Jul. 10, 2001

(54) MEMORY CACHE MANAGEMENT FOR ISOCHRONOUS MEMORY ACCESS

(75) Inventors: John I. Garney, Aloha; Brent S. Baxter, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,832

(22) Filed: Dec. 29, 1998

Related U.S. Application Data

(63) Continuation-in-part of application No. 09/110,344, filed on Jul. 6, 1998, now Pat. No. 6,119,243.

(51) Int. Cl.$^7$ .................................................. G06F 13/14
(52) U.S. Cl. .................... 711/150; 711/117; 711/118; 711/141; 711/142; 711/143; 711/144; 710/21; 710/36; 710/52; 710/61
(58) Field of Search ...................................... 711/201, 202, 711/117, 118, 141–144; 709/200; 210/22, 36, 52, 53, 56, 57, 61

(56) References Cited

U.S. PATENT DOCUMENTS

| | | | | |
|---|---|---|---|---|
| 4,298,929 | * | 11/1981 | Capozzi ................................ | 711/201 |
| 5,544,293 | * | 8/1996 | Nozawa ................................ | 711/202 |
| 5,592,628 | * | 1/1997 | Ueno et al. ........................... | 709/200 |
| 5,765,186 | * | 6/1998 | Searby ................................. | 711/100 |
| 6,012,117 | * | 1/2000 | Traw et al. ........................... | 710/123 |

\* cited by examiner

*Primary Examiner*—Than Nguyen
(74) *Attorney, Agent, or Firm*—Kenyon & Kenyon

(57) ABSTRACT

Isochronous information is transferred between an IO device and a first buffer (N) of a plurality of buffers in a system memory. The isochronous information stored in the plurality of buffers is also stored in a memory cache accessible to a system processor. The state of the memory cache is managed according to an isochronous "X-T" contract that is independent of the "X-T" contact with which data are moved between the IO device and system memory. Further, data associated with a given buffer are moved into and out of the memory cache substantially simultaneously with the transfer of isochronous information between the IO device and other buffers in the system memory.

33 Claims, 7 Drawing Sheets

MEMORY CACHE MANAGEMENT FOR ISOCHRONOUS MEMORY ACCESS

CROSS REFERENCE TO RELATED APPLICATIONS

The present invention is a continuation-in-part of U.S. patent application Ser. No. 09/110,344, now U.S. Pat. No. 6,119,243, entitled "Architecture for the Isochronous Transfer of Information Within a Computer System," to John I. Garney and Brent S. Baxter, filed on Jul. 6, 1998 and assigned to Intel Corporation.

FIELD

The present invention relates to the storage of information in a computer system. More particularly, the present invention relates to memory cache management for isochronous memory access in the computer system.

BACKGROUND

Memory in a computer system can be used to store information, including, for example, information that represents audio, video and multimedia content. When a transfer of information to or from memory is "asynchronous," delays can occur that interfere with the timely completion of the transfer. Consider, for example, FIG. 1, which illustrates a known architecture for connecting an external Input/Output (IO) device 10 to a computer system 100. The computer system 100 includes a system memory 200 coupled to a memory controller 300. The external IO device 10 communicates with the memory controller 300, such as through an IO unit (not shown in FIG. 1), to transfer information with the system memory 200.

Typically, an asynchronous transfer of information from the IO device 10 to the system memory 200 may be delayed by other, more important, activities. However, even a minor delay or gap in some types of information streams will noticeably degrade the quality of the information, such as by causing a momentary freeze in a video presentation or by introducing a stuttering effect in an audio transmission.

When a transfer of information is "synchronous," the sending and receiving devices are synchronized, such as by using the same clock signal, and the transfer of information recurs at identical periodic intervals. However, because the IO device 10 and components within the computer system 100 such as the system memory 200, may be difficult to synchronize, a synchronous transfer of information is not appropriate in many situations.

When a transfer of information is "isochronous," the sending and receiving devices are only partly synchronized, but the sending device transfers information to the receiving device at regular intervals. Such transfers can be used, for example, when information, such as video information, needs to arrive at the receiving device at the same rate it is sent from the sending device, but without precise synchronization of each individual data item. While a synchronous transfer of information occurs at the same time with respect to a clock signal, an isochronous transfer of information may require that up to "X" bits of data be transferred every "T" time units, although precisely when the X bits are transferred within the time T can vary. The IEEE 1394 standard (1995), entitled "High Performance Serial Bus" and available from the Institute of Electrical and Electronic Engineers, is an example of an interface that supports the isochronous transfer of information between an external IO device and a computer system.

In addition to the isochronous transfer of information between the IO device 10 and the computer system 100, the transfer of information within the computer system 100 may also be isochronous. U.S. patent application Ser. No. 09/110, 344, now U.S. Pat. No. 6,119,243 entitled "Architecture for the Isochronous Transfer of Information Within a Computer System," to John I. Garney and Brent S. Baxter, filed on Jul. 6, 1998 discloses architectures that provide for the isochronous transfer of information within the computer system 100.

Problems can arise, however, when isochronous information is transferred with the system memory 200. For example, some types of IO devices, such as a Direct Memory Access (DMA) device, can manage IO traffic to and from the system memory 200, sharing the system memory 200 with a system processor (not shown in FIG. 1). In this case, the IO device 10 and system processor may independently access the shared system memory 200 and take turns operating on the shared data. For example, ownership of the system memory 200 may change between the IO device 10, such as through a DMA controller (not shown in FIG. 1), and the system processor whenever a DMA data transfer starts or stops. That is, ownership of the system memory 200 may pass from the system processor to the IO device 10, or from the IO device 10 to the system processor.

Moreover, a copy of the information stored in the system memory 200 may also be stored in a system processor memory cache 400 to let the system processor access the information more quickly. If so, the information stored in, or the "state" of, the system processor memory cache 400 must be consistent with the information stored in, or the "state" of, the system memory 200 when an ownership change between the IO device 10 and system processor takes place. Note that it is only necessary to bring the system processor memory cache 400 into a state consistent with the system memory 200 at these key synchronization points, and not in between the ownership changes.

This management of the system processor memory cache 400 can delay the transfer of information between the IO device 10 and system memory 200. For example, the system processor memory cache 400 and system memory 200 may typically be brought into agreement before and/or after the transfer of each individual data item within a buffer. The information is then transferred and the system processor memory cache 400 and system memory 200 may again be made to agree before another transfer of information with the IO device 10 is permitted. The delays caused by this "item-by-item" memory cache management can significantly hamper memory timing, especially if large amounts of isochronous data are involved.

The use of large First-Out (FIFO) buffers in the computer system 100, such as in a DMA controller, may solve this problem by storing isochronous information when the system memory 200 cannot be accessed. In this case, information being transferred between the IO device 10 and the system memory 200 can be stored to, or retrieved from, the buffer when the main memory 200 is not available. This buffering can reduce the delays or gaps in an isochronous stream within the computer system 100, but may increase the cost, lower the performance and/or make the computer system 100 more difficult to build, validate and test. Moreover, unless these problems are solved the system may still not deliver information to or from the system memory 200 in a reliable and timely fashion.

SUMMARY

In accordance with an embodiment of the present invention, isochronous information is transferred between an IO device and a first buffer (N) of a plurality of buffers in a system memory. The information stored in the plurality of buffers is also subsequently stored in a memory cache. The state of the memory cache for the buffer N is managed substantially simultaneously with a second transfer of isochronous information between the IO device and a second buffer in the system memory.

DETAILED DESCRIPTION

Figure 1:
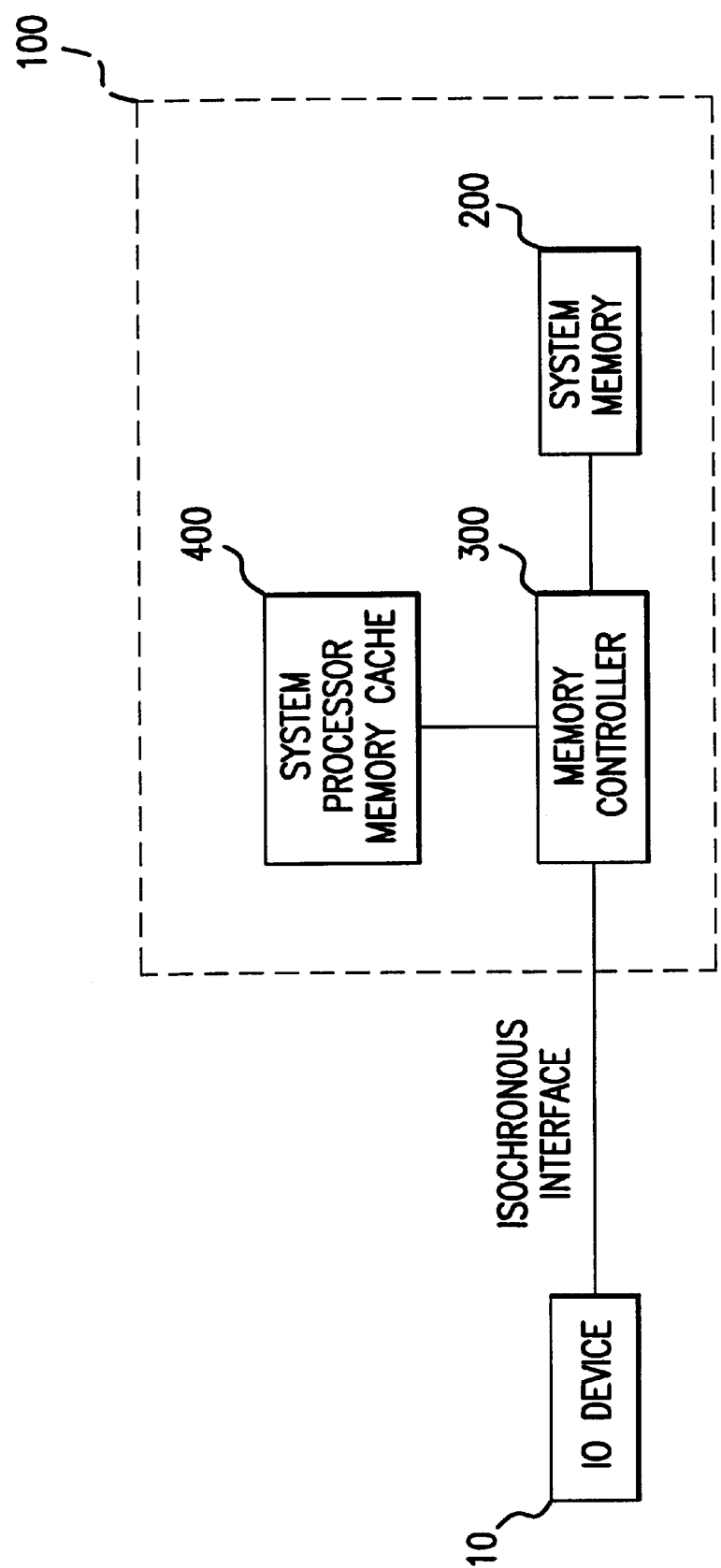
FIG. 1 illustrates a known architecture for connecting an external IO device to a computer system.
Figure 2:
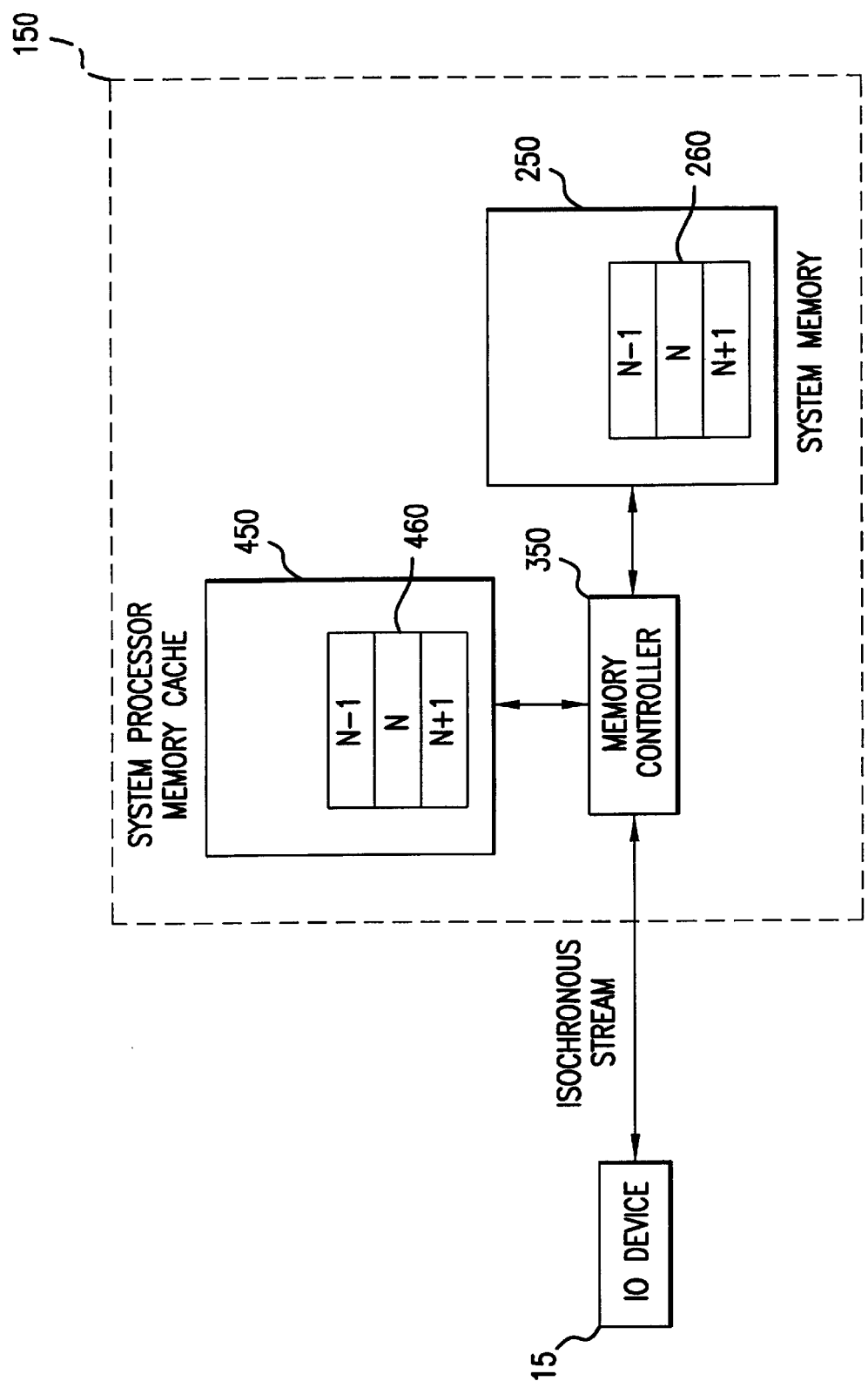
FIG. 2 is a block diagram of an external IO device coupled to a computer system according to an embodiment of the present invention.

An embodiment of the present invention is directed to memory cache management for isochronous memory access in a computer system. Referring now in detail to the drawings wherein like parts are designated by like reference numerals throughout, there is shown in FIG. 2 a block diagram of an external IO device 15, such as a DMA device, coupled to a computer system 150 according to an embodiment of the present invention. The computer system 150 includes a system memory 250 coupled to a memory controller 350. As is known in the art, the system memory 250, may comprise, for example, a Dynamic Random Access Memory (DRAM) array.

The external IO device 15 communicates with the memory controller 350, such as through a DMA controller (not shown in FIG. 2), to transfer information with the system memory 250. As used herein, information may be "transferred" with the system memory 210 by sending the information to, or receiving the information from, the system memory 210.

As is known in the art, a DMA device may transfer information directly with the system memory 250. In this case, the IO device 15 may take control of the system memory 250 to store information in, or to retrieve information from, a plurality of buffers 260. A system processor (not shown in FIG. 2), may also take control of the system memory 250 to store information to, to retrieve information from, these system memory buffers 260. Moreover, the information stored in the system memory buffers 260 is also stored in associated buffers 460 in a system processor memory cache 450. Although only buffers N−1, N and N+1 are shown in FIG. 2, any number of buffers may be used in the computer system 150. As used herein, the term "cache management" refers to operations that reconcile information stored in, or the "state" of, the system memory buffers 260 with the information stored in, or the "state" of, the system processor memory cache buffers 460.

The concept that an amount of information is guaranteed to be transferred in an amount of time may be thought of as an "X-T contract" to deliver the information, where X represents an amount of information to be delivered, and T represents a period of time in which that amount of information will be delivered. An embodiment of the present invention provides the timely transfer of a single item of information within a first buffer between an IO device and system memory, according to a first X-T contract having a first time period, simultaneously with the timely completion of the memory cache management for a second buffer, according to a second X-T contract having a second time period. It should be noted that the first time period may be many times greater than the second time period. This approach reduces the burden of ensuring that the memory cache is managed within a first time period for each individual data item.

According to an embodiment of the present invention, isochronous information is transferred between the IO device 15 and a first buffer (N) in the system memory 250. The state of the system processor memory cache buffers 460 for buffer N is managed substantially simultaneously with a second transfer of isochronous information between the IO device 15 and a second buffer, such as buffer N−1 or N+1, in the system memory 250. The management of the system processor memory cache buffers 460 may be performed, for example, when the IO device 15 gains access to, or relinquishes access of, one of the system memory buffers 260.

The memory cache controller, i.e. the device that performs the management of the system processor memory cache buffers 460, may be, for example, a DMA service routine in an Operating System (OS). The management of the system processor memory cache buffers 460 may instead be performed by, for example, a memory controller 350 chipset or by the IO device 15, if desired.

A detailed explanation of cache management operations according to the present invention will now be provided with respect to FIGS. 3 to 7.

Figure 3:
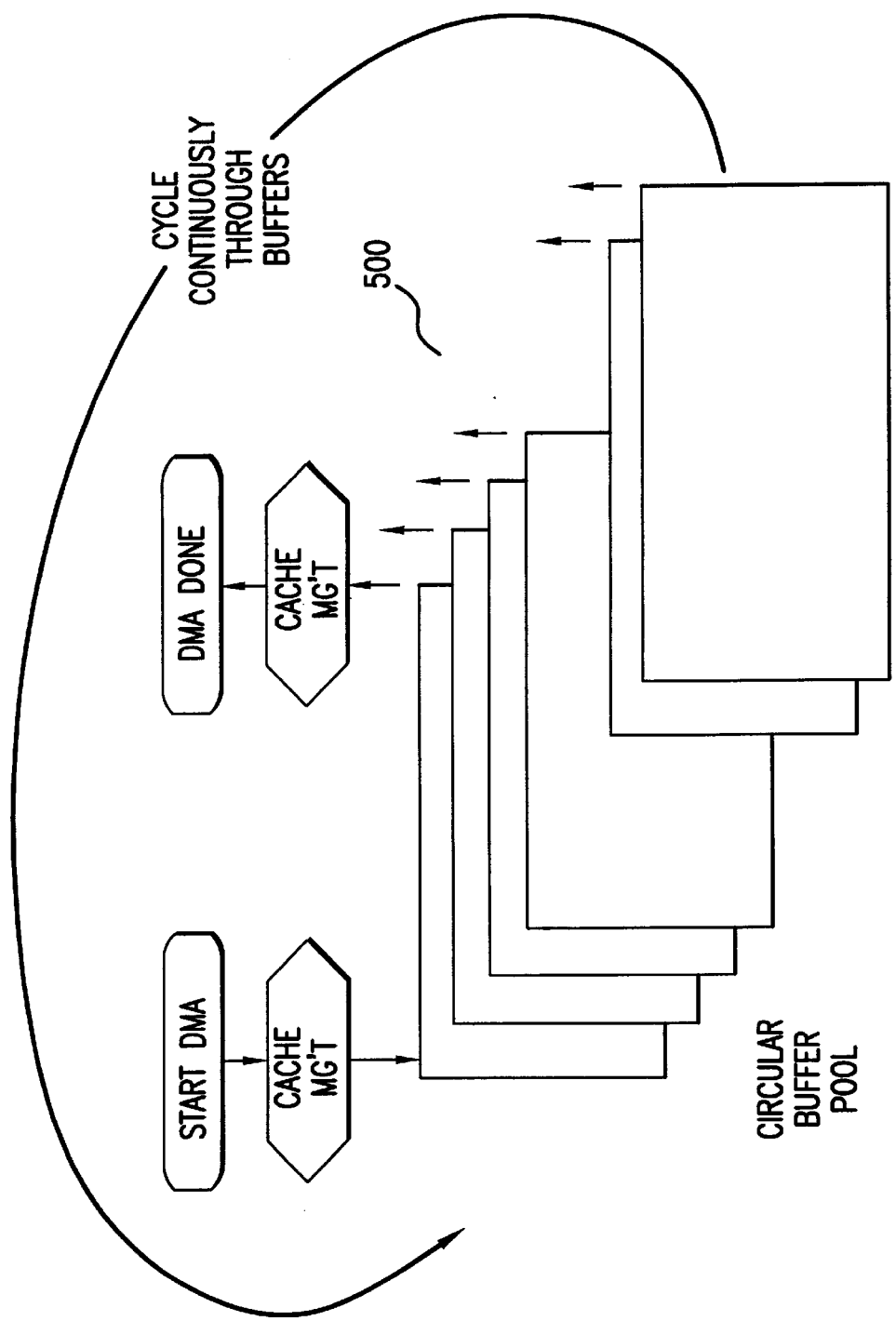
FIG. 3 illustrates a circular buffer pool according to an embodiment of the present invention.

FIG. 3 illustrates a circular buffer pool 500, including a plurality of buffers, according to an embodiment of the present invention. As used herein, the term "buffer N−1" represents the buffer accessed before buffer N is accessed, and the term "buffer N+1" represents the buffer accessed after buffer N is accessed.

According to an embodiment of the present invention, the following operations may be performed each time an isochronous DMA device gains access to or relinquishes the buffer:

(1) The cache for buffer N+1 may be made invalid. That is, the information stored in the memory cache associated with buffer N+1 no longer accurately reflects the information stored in buffer N+1 in the system memory. This operation ensures that information in the cache is not valid to the IO device and prepares buffer N+1 to be accessed by the IO device.

(2) Isochronous information is transferred between the DMA device and buffer N in the system memory.

(3) The cache for buffer N−1 may be made invalid. That is, the information stored in the memory cache associated with buffer N−1 may no longer reflect the information stored in buffer N−1 in the system memory. This ensures there is no "stale" information in the cache so the system processor can process the information from the IO device.

The ordering of the above operations improves system memory access by reducing cache management delays from step (2), where delays may adversely effect memory timing. The delays are instead placed in steps (1) and (3), where the delays can occur substantially simultaneously with the transfer of isochronous information as explained in detail with respect to FIG. 4. This re-ordering of cache management operations lets each memory access be scheduled more precisely, reducing the need for large FIFO buffers. As a result, lower cost isochronous memory pipeline designs are possible. Re-ordering the cache management operations also simplifies the design of the pipeline because the cache management is not done on a "per transaction" basis, which in turn reduces design and validation efforts.

Figure 4:
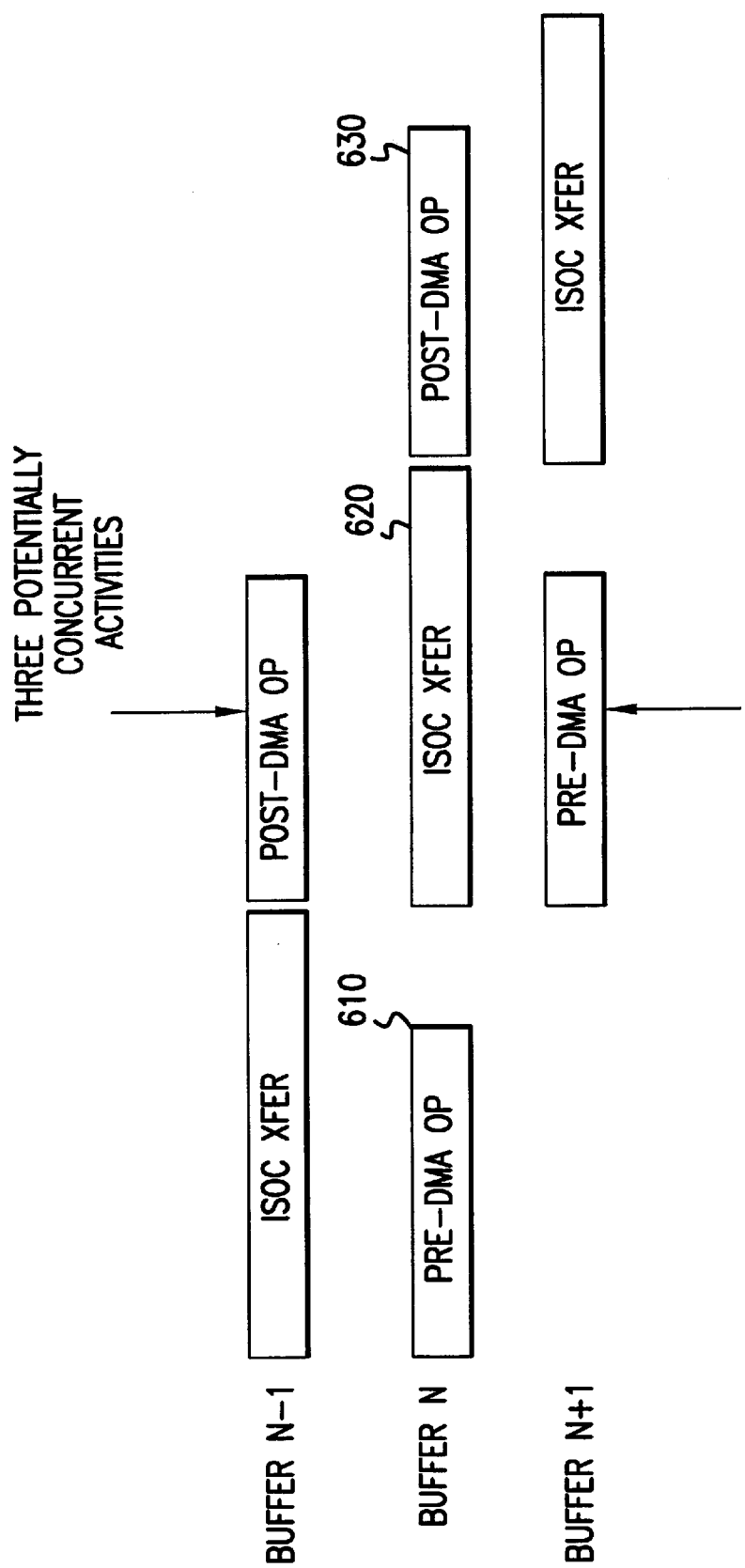
FIG. 4 is a time-line of memory cache management operations according to an embodiment of the present invention.

FIG. 4 is a time-line of memory cache management operations for buffers N−1, N and N+1 according to an embodiment of the present invention. The example illustrates the present invention applied to a chain of buffers, each of which may begin at a different memory address.

Consider, for example, the memory cache management operations 610, 630 associated with buffer N. The "pre-DMA" cache management operation 610 occurs prior to the isochronous transfer of information 620. For example, the system processor may start an isochronous DMA transfer that causes the pre-DMA cache management operation 610 to occur. The "post-DMA" operation 630 occurs at the completion of the isochronous data transfer 620.

The memory cache operations 610, 630 may be sequenced by circuitry that runs independently from the actual isochronous DMA transfer 620. This lets the cache delays be moved to a less time-critical period, rather than falling within the time needed for each memory transfer operation. For example, circuitry that manages the DMA controller's start/stop sequence may be used to initiate these operations. In addition, using DMA hardware may be mostly invisible to system application and device driver software. If so, the advantages of pipelined isochronous memory may be obtained without the cost, complexity and validation efforts normally associated with software-based solutions.

Referring again to FIG. 4, consider first a transfer of isochronous information from a buffer N in a system memory to a DMA device. In this case, the pre-DMA operation 610 may comprise, for example, writing information stored in the memory cache, associated with the buffer N, to the buffer N in the system memory. This may be done, for example, so that the most recent copy of the information is placed in buffer N before being sent to the DMA device.

Note that this management of the memory cache occurs substantially simultaneously with a separate transfer of isochronous information between a DMA device and a different, or separate, buffer in the system memory, namely buffer N−1. After the pre-DMA operation 610 is complete, the isochronous information is transferred 620 from the buffer N in the system memory to the DMA device. Note that during this transfer 620, two other memory cache management operations are being performed as shown by the arrows in FIG. 4, i.e., a post-DMA operation for buffer N−1 and a pre-DMA operation for buffer N+1.

When information is transferred from the buffer N in the system memory to the DMA device, no post-DMA operation 630 may be required because the information in the memory cache has not been modified and will therefore still be correct.

Consider now a transfer of information from a DMA device to buffer N in a system memory. In this case, the pre-DMA operation 610 may comprise, for example, invalidating information in the memory cache associated with buffer N because the information may not be correct, i.e. it will be replaced with information from the DMA device. However, if it is known that the system processor will not access the data in buffer N, the pre-DMA operation 610 may be omitted, if desired, to optimize cache management performance. The post-DMA operation 630 may also comprise invalidating information in the memory cache associated with buffer N because the information has been replaced.

Figure 5:
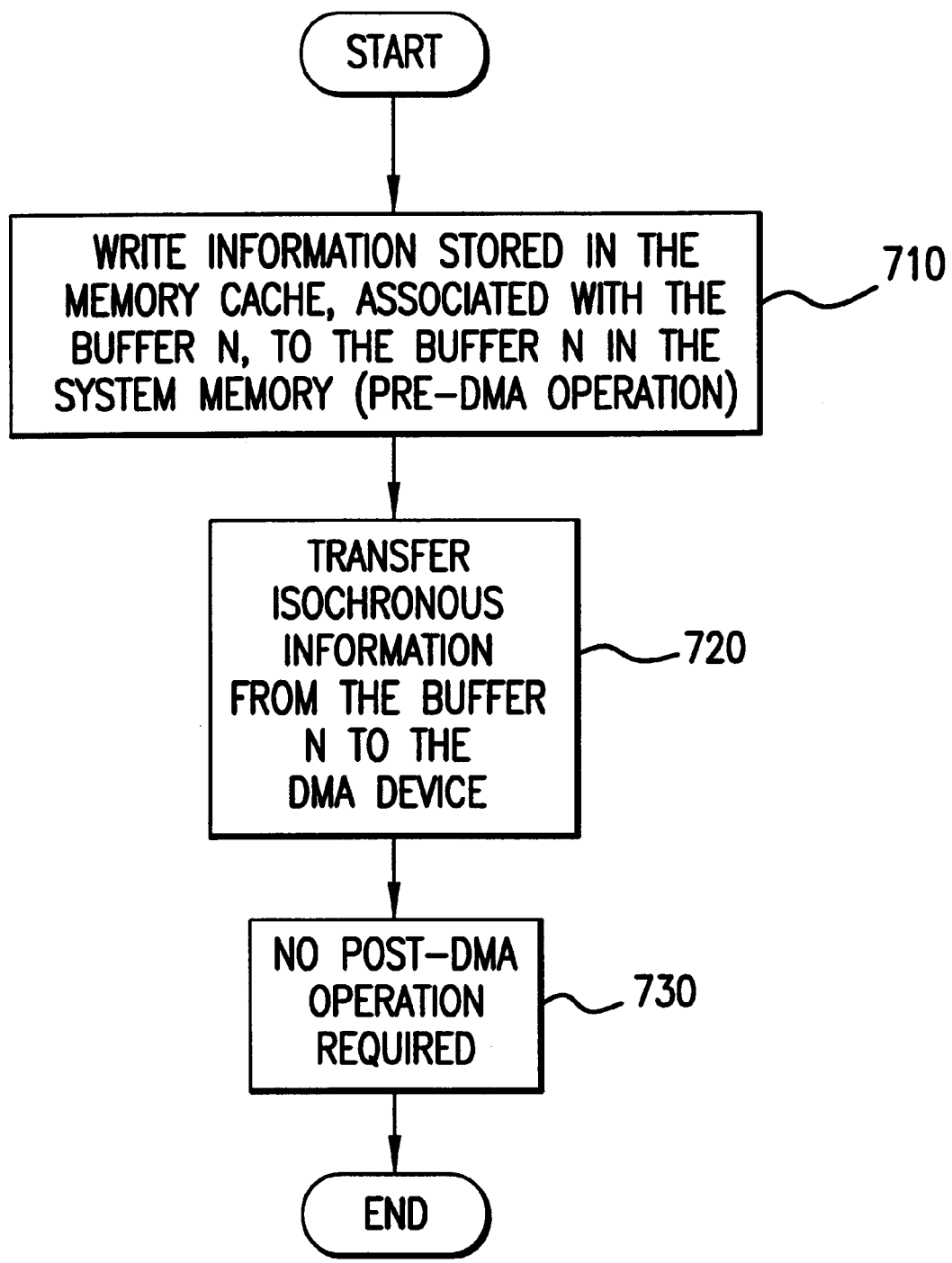
FIG. 5 is a block flow diagram of a method for managing a memory cache when isochronous information is transferred from a buffer N in a system memory to a DMA device according to an embodiment of the present invention.

FIG. 5 is a block flow diagram of a method for managing a memory cache when isochronous information is transferred from a buffer N in a system memory to a DMA device according to an embodiment of the present invention. Information stored in the memory cache, associated with buffer N, is written to buffer N in the system memory as indicated by the pre-DMA operation at 710. The isochronous information is then transferred from the buffer N to the DMA device, and no further memory cache management is required, as indicated at 720 and 730. As described with respect to FIG. 4, the transfer of information to the DMA device occurs substantially simultaneously with memory cache management operations for other buffers, such as, for example, buffers N−1 and/or N+1.

Figure 6:
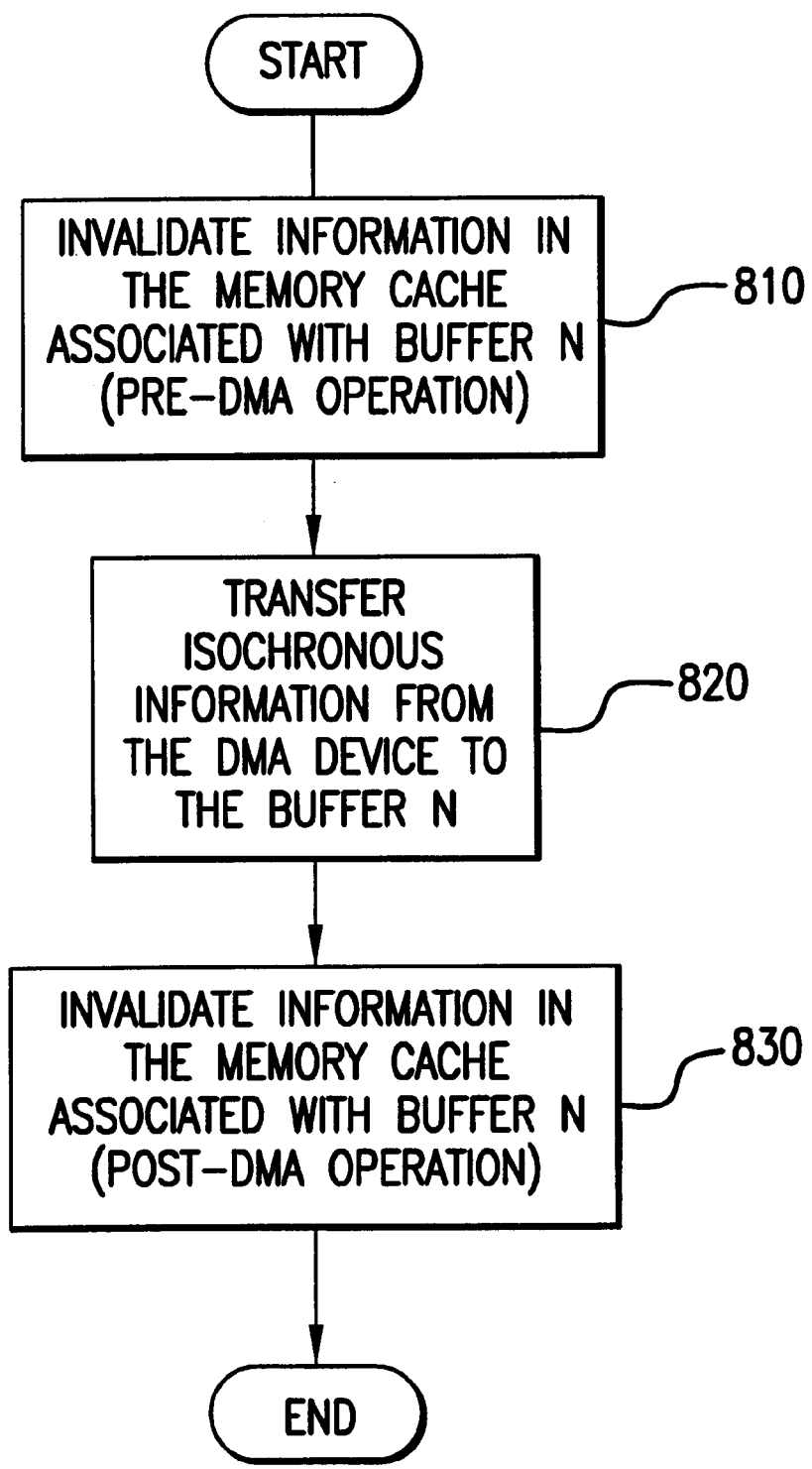
FIG. 6 is a block flow diagram of a method for managing a memory cache when isochronous information is transferred from a DMA device to a buffer N in a system memory according to an embodiment of the present invention.

FIG. 6 is a block flow diagram of a method for managing a memory cache when isochronous information is transferred from a DMA device to a buffer N in a system memory according to an embodiment of the present invention. The information in the memory cache associated with buffer N is invalidated, as indicated by the pre-DMA operation at 810, and the isochronous information is transferred from the DMA device to the buffer N as indicated at 820. As described with respect to FIG. 4, the transfer of information from the DMA device occurs substantially simultaneously with memory cache management operations for other buffers. Finally, information in the memory cache associated with buffer N is invalidated as indicated by the post-DMA operation at 830.

Figure 7:
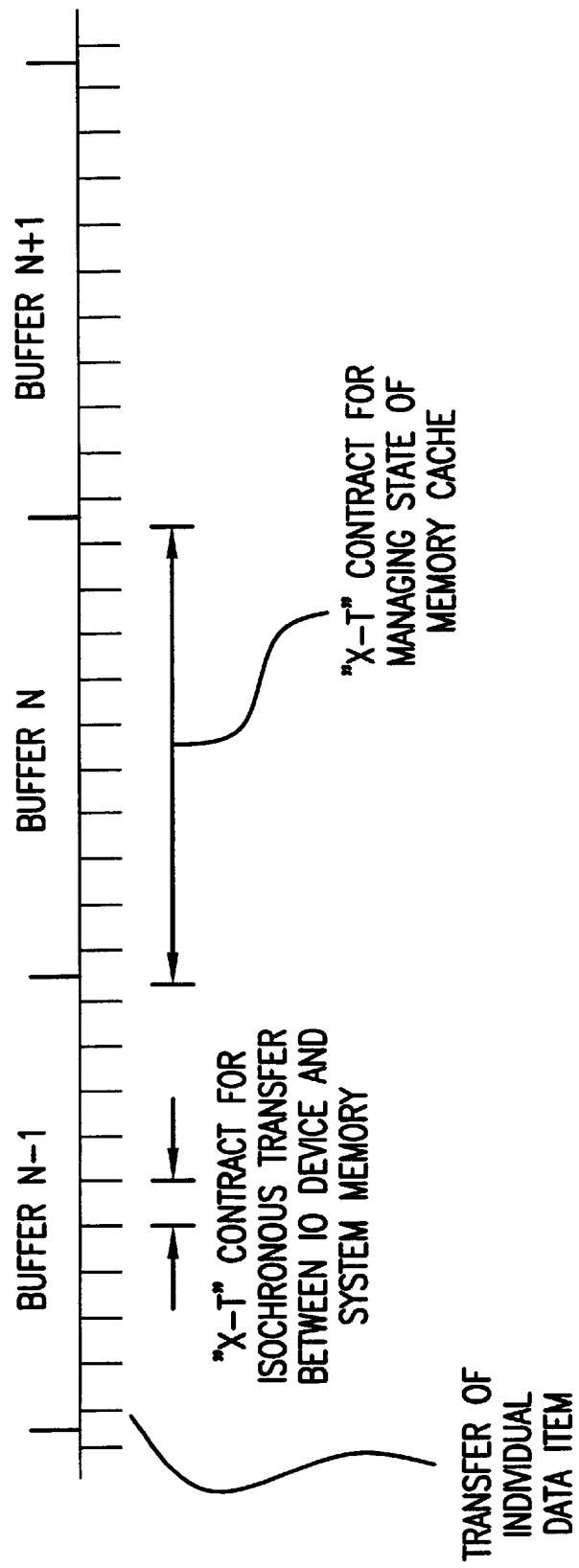
FIG. 7 illustrates independent "X-T" contracts for transferring isochronous information and for managing memory cache according to an embodiment of the present invention.

FIG. 7 illustrates the timing relationships between the transfer of isochronous information between an IO device and memory, one data item at a time, and the management of a memory cache, one buffer at a time, according to an embodiment of the present invention. By increasing the time during which the memory cache may be managed for all the data items in a buffer, the memory cache controller is not constrained to complete the cache management for each data item according to a succession of smaller "X-T" contract periods.

Thus, as explained above with respect to FIGS. 3 to 7, isochronous information is transferred between an IO device and a first buffer (N) of a plurality of buffers in a system memory according to an embodiment of the present invention. The isochronous information stored in the plurality of buffers is also stored in a memory cache accessible to a system processor. The state of the memory cache is managed according to an isochronous "X-T" contract that is independent of the "X-T" contract with which data are moved between the IO device and system memory. Further, data associated with a given buffer are moved into and out of the memory cache substantially simultaneously with the transfer of isochronous information between the IO device and other buffers in the system memory.

Although various embodiments are specifically illustrated and described herein, it will be appreciated that modifications and variations of the present invention are covered by the above teachings and within the purview of the appended claims without departing from the spirit and intended scope of the invention. For example, although particular memory cache management operations were used to illustrate embodiments of the present invention, it will be appreciated that other types of operations will also fall within the scope of the invention. Moreover, the present invention applies to a broad range of topologies for connecting IO devices, system memory, cache memory and other computing devices, and is therefore a general approach that includes a broad range of specific implementations. In addition, although particular standards and techniques were described with respect to the isochronous transfer of information, it will be understood that the present invention is not limited to a particular standard or technique. Finally, although software or hardware are described to control certain functions, such functions can be performed using either software, hardware or a combination of software and hardware, as is well known in the art. As is also known, software may be stored, such as in memory, in the form of instructions, including micro-code instructions, adapted to be executed by a processor. As used herein, the phrase "adapted to be executed by a processor" encompasses instructions that need to be translated before being executed by the processor.

What is claimed is:

1. A method for managing a memory cache, comprising:
    transferring isochronous information between an input/output (IO) device and a first buffer (N) of a plurality of buffers in a system memory, the information stored in the plurality of buffers also being subsequently stored in the memory cache; and
    managing the state of the memory cache for the buffer N substantially simultaneously with a second transfer of isochronous information between the IO device and a second buffer in the system memory.

2. The method of claim 1, wherein the IO device is a direct memory access (DMA) device.

3. The method of claim 2, wherein said managing occurs when the DMA device performs one of (1) gaining access to one of the plurality of buffers in the system memory and (2) relinquishing access to one of said plurality of buffers in the system memory.

4. The method of claim 2, wherein the transfer of each individual data item between the IO device and the system memory proceeds according to a first isochronous transfer guarantee, with a first time period T, substantially simultaneously with the management of the memory cache according to a second isochronous transfer guarantee.

5. The method of claim 2, wherein the plurality of buffers in the system memory comprise a circular buffer pool, buffer N−1 representing a buffer accessed before the buffer N is accessed and buffer N+1 representing a buffer accessed after buffer N is accessed.

6. The method of claim 5, wherein said transferring comprises:
    transferring isochronous information from the buffer N in the system memory to the DMA device.

7. The method of claim 6, wherein said second buffer is the buffer N−1 and said managing comprises:
    writing information stored in the memory cache, associated with the buffer N, to the buffer N in the system memory.

8. The method of claim 5, wherein said transferring comprises:
    transferring isochronous information from the DMA device to the buffer N in the system memory.

9. The method of claim 8, wherein said second buffer is buffer N−1 and said managing comprises:
    invalidating information in the memory cache associated with the buffer N.

10. The method of claim 9, wherein said invalidating is only performed if the information in the memory cache associated with buffer N has been modified by a system processor.

11. The method of claim 8, wherein said second buffer is buffer N+1 and said managing comprises:
    invalidating information in the memory cache associated with the buffer N.

12. The method of claim 2, wherein said managing is performed by a DMA service routine in a system processor operating system.

13. The method of claim 1, wherein said managing is performed by a memory controller chipset.

14. The method of claim 1, wherein said managing is performed by the IO device.

15. A method for managing a memory cache, the memory cache storing information also stored in a plurality of buffers in a system memory, comprising:
    managing the state of the memory cache for a buffer (N) in the system memory substantially simultaneously with a separate transfer of isochronous information between a direct memory access (DMA) device and a separate buffer in the system memory; and
    after said managing, transferring isochronous information from the buffer N in the system memory to the DMA device.

16. The method of claim 15, wherein said managing comprises:
    writing information stored in the memory cache, associated with the buffer N, to the buffer N in the system memory.

17. A method for managing a memory cache, the memory cache storing information also stored in a plurality of buffers in a system memory, comprising:
    managing the state of the memory cache for a buffer N in the system memory substantially simultaneously with a first separate transfer of isochronous information between a direct memory access (DMA) device and a first separate buffer in the system memory;
    after said managing, transferring isochronous information from the DMA device to the buffer N in the system memory; and
    after said transferring, managing the state of the memory cache for the buffer N substantially simultaneously with a second separate transfer of isochronous information between the DMA device and a second separate buffer in the system memory.

18. The method of claim 17, wherein said managing the state of the memory cache before and after said transferring comprises:
    invalidating information in the memory cache associated with buffer N.

19. An article of manufacture comprising a computer-readable medium having stored thereon instructions adapted to be executed by a processor, the instructions which, when executed, cause the processor to manage a memory cache, comprising:
    transferring isochronous information between an Input/Output (IO) device and a first buffer (N) of a plurality of buffers in a system memory, the information stored in the plurality of buffers also being subsequently stored in the memory cache; and
    managing the state of the memory cache for the buffer N substantially simultaneously with a second transfer of isochronous information between the IO device and a second buffer in the system memory.

20. The article of claim 19, wherein said managing occurs when the IO device performs one of (1) gaining access to one of the plurality of buffers in the system memory and (2) relinquishing access to one of said plurality of buffers in the system memory.

21. The article of claim 19, wherein the transfer of each individual data item between the IO device and the system memory proceeds according to a first isochronous transfer guarantee, with a first time period T, substantially simultaneously with the management of the memory cache according to a second isochronous transfer guarantee.

22. The article of claim 19, wherein the plurality of buffers in the system memory comprise a circular buffer pool, buffer N–1 representing a buffer accessed before the buffer N is accessed and buffer N+1 representing a buffer accessed after buffer N is accessed.

23. An apparatus for managing a memory cache, the memory cache storing information also stored in a plurality of buffers in a system memory, comprising:
   a memory cache controller configured to manage the state of the memory cache for a first buffer (N) of the plurality of buffers substantially simultaneously with a transfer of isochronous information between an IO device and a second buffer in the system memory.

24. The apparatus of claim 23, wherein the IO device is a direct memory access (DMA) device.

25. The apparatus of claim 23, wherein said management occurs when the IO device performs one of (1) gaining access to one of the plurality of buffers in the system memory and (2) relinquishing access to one of said plurality of buffers in the system memory.

26. The apparatus of claim 23, wherein the apparatus causes transfer of each individual data item between the IO device and the system memory proceeds according to a first isochronous transfer guarantee, with a first time period T, substantially simultaneously with the management of the memory cache according to a second isochronous transfer guarantee.

27. The apparatus of claim 23, wherein the plurality of buffers in the system memory comprise a circular buffer pool, buffer N–1 representing a buffer accessed before the buffer N is accessed and buffer N+1 representing a buffer accessed after buffer N is accessed.

28. A computer system comprising
   a system memory storing information in a plurality of buffers;
   a memory cache also storing information stored in the plurality of buffers; and
   a memory cache controller coupled to said system memory and said memory cache, said memory cache controller being configured to manage the state of said memory cache for a first buffer (N) of the plurality of buffers substantially simultaneously with a transfer of isochronous information between an input/output device and a second buffer in said system memory.

29. The system of claim 28, further comprising the input/output device.

30. The system of claim 29, wherein the input/output device is a direct memory access (DMA) device.

31. The system of claim 28, wherein said management occurs when the input/output device performs one of (1) gaining access to one of the plurality of buffers in the system memory and (2) relinquishing access to one of said plurality of buffers in the system memory.

32. The system of claim 28, wherein the apparatus causes transfer of each individual data item between the IO device and the system memory proceeds according to a first isochronous transfer guarantee, with a first time period T, substantially simultaneously with the management of the memory cache according to a second isochronous transfer guarantee.

33. The system of claim 28, wherein the plurality of buffers in the system memory comprise a circular buffer pool, buffer N–1 representing a buffer accessed before the buffer N is accessed and buffer N+1 representing a buffer accessed after buffer N is accessed.

* * * * *